United States Patent [19]

DeRosa

[11] Patent Number: 4,895,286

[45] Date of Patent: Jan. 23, 1990

[54] CAMERA SUPPORT

[76] Inventor: James V. DeRosa, 310A N. Second St., Sierra Vista, Ariz. 85635-1501

[21] Appl. No.: 250,664

[22] Filed: Sep. 29, 1988

[51] Int. Cl.⁴ .............................................. A45F 3/10
[52] U.S. Cl. ................................... 224/265; 224/270; 224/908; 354/82; 354/293
[58] Field of Search ............... 224/908, 265, 266, 270, 224/269, 201, 189, 208, 249, 202, 261, 262; 354/82, 293; 352/243

[56] References Cited

U.S. PATENT DOCUMENTS

| | | | |
|---|---|---|---|
| 753,877 | 3/1904 | Gra | 224/189 |
| 2,015,869 | 10/1935 | Pulz | 88/1 |
| 2,506,685 | 5/1950 | Sadloski et al. | 224/201 |
| 2,643,803 | 6/1983 | Bates | 224/254 |
| 2,712,779 | 7/1955 | Tolcher | 224/908 |
| 3,767,095 | 10/1973 | Jones | 224/5 |
| 4,244,500 | 1/1981 | Fournier | 224/265 |
| 4,526,308 | 7/1985 | Dovey | 224/265 |

Primary Examiner—Linda J. Sholl
Attorney, Agent, or Firm—Henderson & Sturm

[57]. ABSTRACT

Disclosed is a shoulder-mounted camera support adapted to cameras of many sizes and types and providing a convenient and comfortable carrier that frees the using person's hands for control, etc. The support includes a saddle configured to fit downwardly over the shoulder of the using person and having mounted on its upper part a camera-supporting platform. A lower rear part of the saddle has connected thereto a strap having a terminal end for receiving a belt to encircle the user's waist and add to the stability of the structure. A flexible element is arranged in such manner as to extend around the user's neck to function as a tether that retains the support against complete separation from the user in the event of an accident or the like tending to dislodge the support from the person.

1 Claim, 1 Drawing Sheet

CAMERA SUPPORT

BACKGROUND AND SUMMARY OF THE INVENTION

Many forms of camera supports have been provided in the prior art, all suffering mainly from high cost, inconvenience and short life. The present invention affords a simple, light-weight structure that is comfortable to wear, easy to mount and dismount and adjustable to accommodate users of different statures, heights, etc. A feature of the invention is the adjustability of the platform-to-camera connection. Another feature is the means functioning as a tether to prevent complete separation of the support from the user.

Further features will become apparent as a preferred embodiment is disclosed in the ensuing description and accompanying drawing.

DETAILED DESCRIPTION OF A PREFERRED EMBODIMENT OF THE INVENTION

Figure 1:
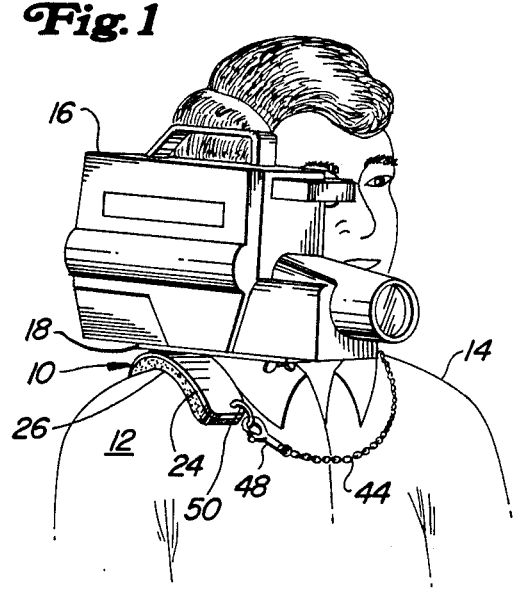
FIG. 1 is a partial perspective showing the inventive support in use.
Figure 3:
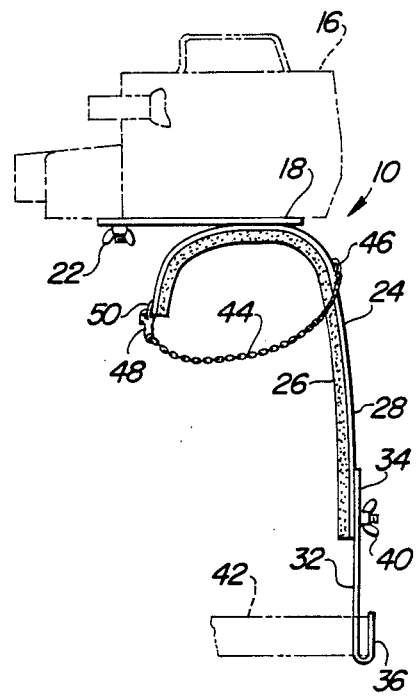
FIG. 3 is a side view of the support apart from the user.
Figure 4:
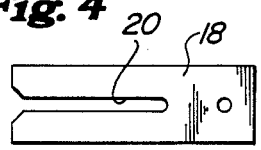
FIG. 4 is a plan view of the camera platform.
Figure 2:
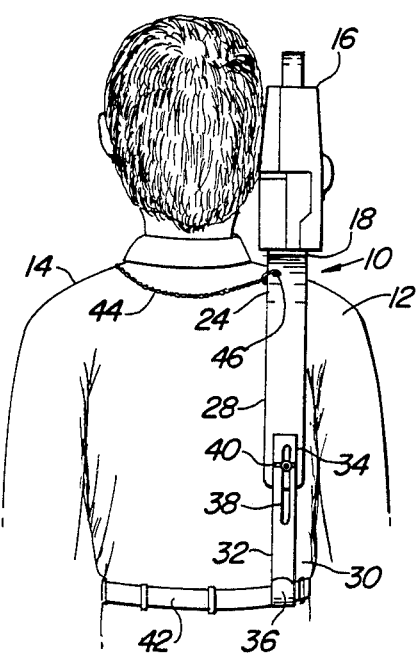
FIG. 2 is a rear view of the support mounted on the shoulder of a user.
Figure 5:
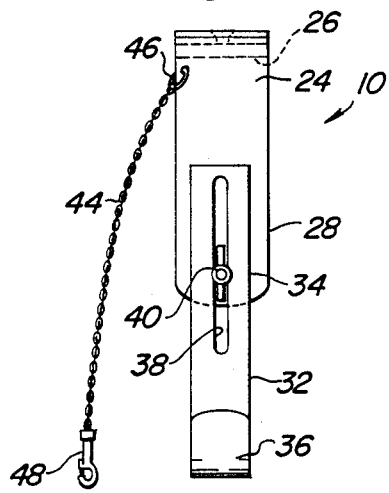
FIG. 5 is a rear view of the support apart from the user.

In FIGS. 1-3 and 5, the numeral (10) designates the inventive support as a whole, arranged on one shoulder (12) of a using person (14) in such manner as to leave the user's hands free. The numeral (16) denotes a typical camera which may be of any type, size, etc. The support structure includes a platform (18) of any suitable construction and the camera is removably but solidly mounted on the platform by means including a fore-and-aft slot (20) (FIG. 4) in the platform and a cooperative securing means including a wing nut (22), for example. The slot (20) enables selective fore-and-aft adjustment of the camera.

A saddle (24), of any suitable material, is configured to fit comfortably downwardly on the user's shoulder and is shown as being padded at (26) at its under side. The saddle, at its rear, is extended downwardly as an integral part (28) which terminates somewhat above the user's waist area (30), and a depending strap (32) has an upper connection (34) to this saddle part and a lower terminal end formed as a hook (36). The connection (34) includes a slot (38) in the strap and a cooperative fastener including a wing nut (40). The connection (34) thus provides for vertical adjustment between the saddle and strap for selective positioning of the strap hook (36) to suit the position of the user's waist and particularly a typical belt (42) which encircles the user's waist and is received by the hook (36). This arrangement adds to the snug and comfortable fit of the total support on the user. The strap (32) may be made of any suitable material and the hook (36) may be affixed to or be an integral part of the strap, depending upon the strap material.

As a further adjunct to the convenience and comfort of the support, a tether means in the form of a flexible element such as a chain (44) has one end connected at (46) to the saddle at the rear of the latter and has its other end fitted with a detachable connector, such as a snap (48) which is releasably connectible to a ring (50) at a fore part of the saddle. After the user mounts the saddle and camera carried thereby on his shoulder, he connects the chain snap (48) to the ring (50). The chain is of such length as to comfortably encircle the user's neck and serves to prevent complete separation of the support from the person in the event of some circumstance tending to dislodge the support.

It will be seen from the foregoing that the support provides a simple, low-cost structure for the carrying of cameras of various types. The support features several areas of adjustability. Features and advantages other than those pointed out herein will readily occur to those versed in the art, as will many modifications in and additions to the preferred embodiment disclosed, all without departure from the spirit and scope of the invention.

I claim:

1. A camera support, consisting of:
a horizontally disposed camera-supporting platform, a form-fitting saddle operatively attached to said camera supporting platform and configured to fit downwardly over the shoulder of a using person and having a depending rear part terminating short of the using person's waist area, means mounting the platform of the saddle, a strap having a connection to the saddle rear part and depending to a terminal end at about the waist of the using person, and said terminal end at about the waist of the using person, and said terminal end being configured to receive a belt encircling the waist of the using person; in which the connection of the strap to the saddle rear part is selectively vertically adjustable to vary the position of the terminal end of the strap; and further including a flexible element connected at one end to an upper rear portion of the saddle and having such length as to comfortably encircle the neck of the using person, said element having a free end provided with a detachable connector, and a front portion of the saddle having a connector-receiver for selective connection and disconnection of the connector.

* * * * *